United States Patent
McCoy (10) Patent No.: US 6,584,586 B1
(45) Date of Patent: Jun. 24, 2003

(54) APPARATUS AND METHOD FOR CAPTURING AND TRANSFERRING INTERNAL SYSTEM ACTIVITY

(75) Inventor: Jody A. McCoy, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/532,385

(22) Filed: Mar. 22, 2000

(51) Int. Cl.$^7$ .................................................. G06F 11/00
(52) U.S. Cl. .......................................................... 714/45
(58) Field of Search .............................. 714/6, 25, 40, 714/41, 45

(56) References Cited

U.S. PATENT DOCUMENTS

| | | | | |
|---|---|---|---|---|
| 5,715,435 A | * | 2/1998 | Ikei ............................... | 703/23 |
| 5,737,521 A | * | 4/1998 | Kleber et al. .................. | 714/45 |
| 5,764,885 A | * | 6/1998 | Sites et al. ..................... | 714/45 |
| 5,875,293 A | | 2/1999 | Bell et al. | |
| 6,023,580 A | | 2/2000 | Sifter | |

* cited by examiner

Primary Examiner—Nadeem Iqbal
Assistant Examiner—Tim Bonura
(74) Attorney, Agent, or Firm—Meyertons Hood Kivlin Kowert & Goetzel, P.C.; B. Noël Kivlin (57) ABSTRACT

An apparatus is disclosed for capturing and transferring internal system activity of a computer under test. In one embodiment, the apparatus includes a bus interface, a memory, an external interface, and circuitry coupling the three together. The bus interface connects to an internal system bus of the system under test. The memory is for storing information indicative of internal system activity. The external interface couples to an external, monitoring system. The circuitry partitions the memory into at least two banks, each having multiple buffers. One of the multiple buffers in each bank is a trace buffer that receives instruction trace information from the processor of the system under test. The multiple buffers may further include a system memory image buffer, a processor data buffer, and a bus activity buffer. When any one of the buffers in a given bank of the memory becomes full, a bank switch occurs. Immediately prior to the bank switch, the contents of system memory are copied to the system memory image buffer, and the internal settings of the processor are similarly copied to the processor data buffer. Advantageously, if any errors are detected at this time, the previous memory bank still contains a pre-error snapshot of the processor contents and memory contents. Furthermore, the previous memory bank has an extensive record of pre-error bus activity and trace history. The external interface provides a means for transporting the memory bank contents to an external system continually, or alternately, whenever the memory bank contents are desired (e.g. when a fault is detected).

12 Claims, 3 Drawing Sheets

APPARATUS AND METHOD FOR CAPTURING AND TRANSFERRING INTERNAL SYSTEM ACTIVITY

BACKGROUND OF THE INVENTION

1. Field of the Invention

The present invention relates to an apparatus and method that facilitates the capture and transfer of the internal activity of a computer system. More specifically, the present invention relates to an expansion card that, when installed in a computer system, tracks such internal activities as, e.g., process flow, memory state, and bus activity, and exports a record of such internal activities to a separate system.

2. Description of the Related Art

Evolution of Computer Architecture. Early computer systems included a processor (or CPU), random access memory (RAM), and certain peripheral devices such as a floppy drive, a keyboard and a display. These components were typically coupled together using a network of address, data and control lines, commonly referred to as a "bus." As computer technology evolved, it became common to connect additional peripheral devices to the computer through ports (such as a parallel port or a serial port), or by attaching the peripheral devices (e.g. an expansion card) to sockets on the main system circuit board (or "motherboard") which were connected to the system bus. One early bus that still is in use today is the Industry Standard Architecture (ISA) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

The components which connect to a given bus receive data from the other components on the same bus via the bus signal lines. Selected components may operate as "bus masters" to initiate data transfers over the bus. Each component on the bus circuit operates according to a bus protocol that defines the purpose of each bus signal and regulates such parameters as bus speed and arbitration between components requesting bus mastership. A bus protocol also determines the proper sequence of bus signals for transferring data over the bus. As computer systems have continued to evolve, new bus circuits offering heightened functionality have replaced older bus circuits, allowing existing components to transfer data more effectively.

One way in which the system bus has been made more effective is to permit data to be exchanged in a computer system without the assistance of the CPU. To implement this design, a new bus architecture called Extended Industrial Standard Architecture (EISA) was developed. The EISA bus protocol permits system components residing on the EISA bus to obtain mastership of the bus and to run cycles on the bus independently of the CPU. Another bus that has become increasingly popular is the Peripheral Component Interconnect (PCI) bus. Like the EISA bus, the PCI bus provides bus master capabilities to devices connected to the PCI bus. The PCI bus also operates at clock speeds of 33 MHz or faster. Current designs contemplate implementing a 100 MHz PCI bus.

To ensure that existing components continue to remain compatible with future generations of computer systems, new computer designs often include many different types of buses. Because different buses operate according to different protocols, the computer design uses bridge devices to interface, or bridge, the different buses. Such a scheme permits components coupled to one bus to exchange data with components coupled to another bus.

System Functionality Testing. A typical computer system includes a large number of functional components that are designed and tested separately to verify their functionality. After the functional components are combined, however, the system as a whole must be tested to verify its functionality. Because of the level of complexity of the individual components and the system as a whole, this system level test often reveals malfunctions not identified in the component-level tests.

In the computer industry, simply knowing of the existence of a system-level malfunction is rarely enough. The malfunction must also be corrected. This presents a challenge, because many system-level malfunctions are transient and difficult to reproduce. Without such reproducibility, the causes of malfunctions are difficult to locate precisely.

One method for precisely locating the cause of most malfunctions is to generate a history of the operations performed by the system. Then, when a malfunction occurs, one can identify the state of the system when the malfunction was recognized and "trace backwards", using the history to identify the source of the malfunction.

There are some obstacles to this approach which may not be immediately apparent. Many processors today can perform nearly $10^9$ operations per second, and existing computer buses can operate at 100 MHz to transfer eight bytes of data per clock cycle. It may require hours or even days for a transient malfunction to manifest itself. This is a mind-boggling amount of history to record. Further, the operations that occur internal to the processor are not normally available for recording.

SUMMARY OF THE INVENTION

The above problems described above are at least in part addressed by the apparatus and method for capturing and transferring internal system activity disclosed herein. In one embodiment, the apparatus includes a bus interface, a memory, an external interface, and circuitry coupling the three together. The bus interface connects to an internal system bus of the system under test. The memory is for storing information indicative of internal system activity. The external interface couples to an external, monitoring system. The circuitry partitions the memory into at least two banks, each having multiple buffers. One of the multiple buffers in each bank is a trace buffer that receives instruction trace information from the processor of the system under test. The multiple buffers may further include a system memory image buffer, a processor data buffer, and a bus activity buffer. When any one of the buffers in a given bank of the memory becomes full, a bank switch occurs. Immediately prior to the bank switch, the contents of system memory are copied to the system memory image buffer, and the internal settings of the processor are similarly copied to the processor data buffer. Advantageously, if any errors are detected at this time, the previous memory bank still contains a pre-error snapshot of the processor contents and memory contents. Furthermore, the previous memory bank has an extensive record of pre-error bus activity and trace history. The external interface provides a means for transporting the memory bank contents to an external system continually, or alternately, whenever the memory bank contents are desired (e.g. when a fault is detected).

BRIEF DESCRIPTION OF THE DRAWINGS

A better understanding of the present invention can be obtained when the following detailed description of the preferred embodiment is considered in conjunction with the following drawings, in which:

FIG. 6 shows a preferred CTC memory configuration. While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1:
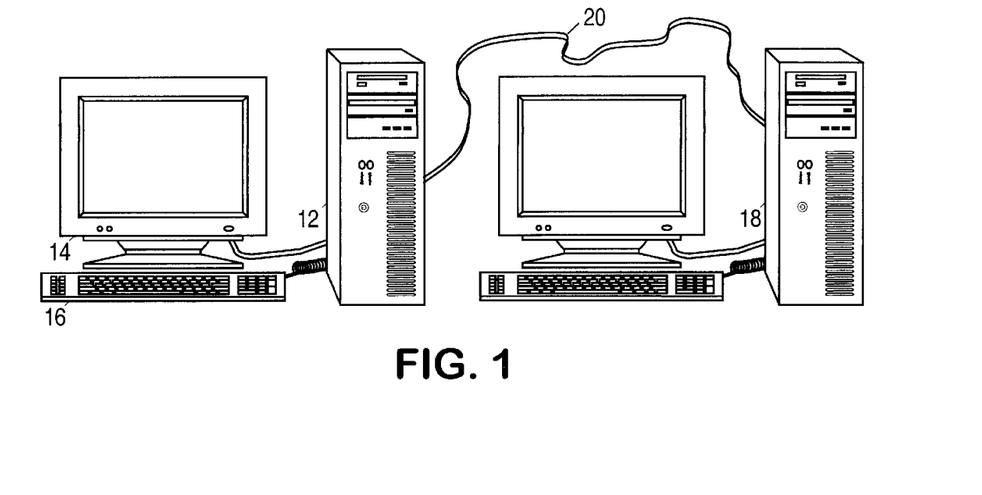
FIG. 1 is a system view of a system-under-test coupled to an external monitoring computer.

Turning now to the figures, FIG. 1 shows a computer system 12 having a display 14 and user input device 16. During system-level testing, the system-under-test 12 includes a capture and transport expansion card (not specifically shown here) that monitors the internal system activity. The capture and transport expansion card (CTC) preferably supports multiple testing configurations. In one configuration, the CTC forwards all of the detected activity to a second system 18 via a high speed connection 20. System 18 could be running an emulation of system 12 and comparing the expected internal system activity to the activity reported by the CTC. When a divergence occurs, the testing system 18 may report the divergence and then either restart the system under test 12, or resynchronize with the system under test 12. In either case, the testing system 18 preferably continues monitoring for subsequent divergences. Alternatively, the testing system 18 could be simply storing the detected activity for later review.

In another configuration, the CTC itself monitors the system under test 12 for error events and, upon detection of such an event, transmits a system memory image and a history of operations that occurred between system memory image capture and the detected event. It will be apparent from the discussion below that the CTC also provides the flexibility for other configurations if desired.

Figure 2:
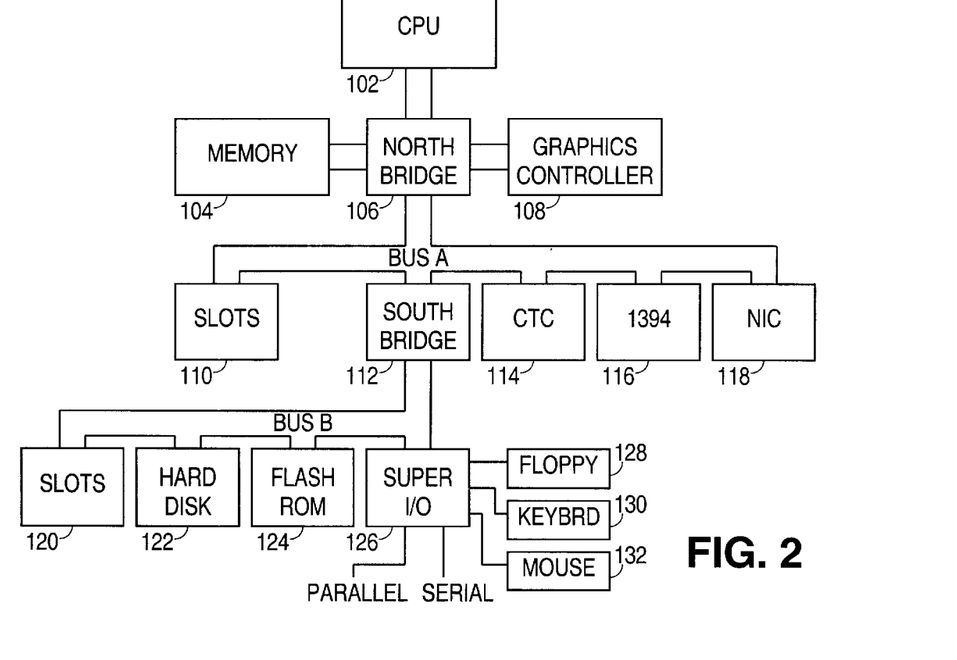
FIG. 2 is a representative functional block diagram of a system under test.

FIG. 2 shows a block diagram of an exemplary system 12. The computer system 12 includes a processor (CPU) 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an advanced graphics processor (AGP) bus. The North bridge 106 couples CPU 102, memory 104, and graphics controller 108 to the other peripheral devices in the system through a primary expansion bus (BUS A) such as a PCI bus or an EISA bus. Various components that comply with the bus protocol of BUS A may reside on this bus, such as a capture and transport expansion card (CTC) 114, a IEEE 1394 interface device 116, and a network interface card (NIC) 118. These components may be integrated onto the motherboard, or they may be plugged into expansion slots 110 that are connected to BUS A. As technology evolves and higher-performance systems are increasingly sought, there is a greater tendency to integrate many of the devices into the motherboard which were previously separate plug-in components.

If other, secondary, expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location relative to the North bridge 106 in a typical computer system drawing. Various components that operate with the bus protocol of BUS B may reside on this bus, such as hard disk controller 122, Flash ROM 124, and Super I/O controller 126. Slots 120 may also be provided for plug-in components that comply with the protocol of BUS B.

The Super I/O controller 126 typically interfaces to basic input/output devices such as a keyboard 130, a mouse 132, a floppy disk drive 128, a parallel port, a serial port, and sometimes various other input switches such as a power switch and a suspend switch. The Super I/O controller 126 often has the capability to handle power management functions such as reducing or terminating power to components such as the floppy drive 130, and blocking the clock signals that drive components such as the bridge devices 106, 112 thereby inducing a sleep mode in the expansion buses. The Super I/O controller 126 may further assert System Management Interrupt (SMI) signals to various devices such as the CPU 102 and North bridge 106 to indicate special conditions pertaining to input/output activities such as sleep mode. The Super I/O controller 126 may incorporate a counter or a Real Time Clock (RTC) to track the activities of certain components such as the hard disk 122 and the primary expansion bus, inducing a sleep mode or reduced power mode after a predetermined time of inactivity. The Super I/O controller 126 may also induce a low-power suspend mode if the suspend switch is pressed, in which the power is completely shut off to all but a few selected devices.

In FIG. 2, the CTC 114 is shown coupled to the primary expansion bus, which is preferably a PCI bus. In an alternative embodiment, the CTC may be connected to a socket on the CPU bus. As described further below, the CTC captures all bus activity and preferably also takes periodic snapshots of the state of memory 104. Additionally, the CTC 114 preferably acquires the contents of the branch trace history buffer for CPUs that are so equipped.

Many modern processors can be configured to provide instruction trace data. Circuitry internal to the processor monitors the operations of the processor and records information such as changes to selected registers, jumps, calls, returns, and interrupts. The information is preferably stored in the processor in compressed form until a predetermined amount has accumulated. Once the limit is reached, the processor automatically hesitates long enough for the accumulated trace information to be exported to a trace buffer in a chosen location such as memory 104 or CTC 114. (Typically, the location of the trace buffer can be specified by setting an internal pointer register in the processor.) Once the trace information has been moved to the trace buffer, the processor continues with its previous activity.

The CTC 114 is preferably configured to periodically capture the contents of the trace buffer along with a system memory image, and some processor data structures (e.g. the system management mode save state). This capture may be accomplished by having the CTC 114 periodically assert a System Management Interrupt (SMI), forcing the processor to execute an interrupt routine that transfers the required information to the CTC 114. If desired, the interrupt routine can initiate a direct memory access (DMA) transfer to provide the system memory image to the CTC 114. The interrupt routine can cause the processor to provide any other desired data directly to the CTC 114.

If the trace buffer is in memory 104, the system memory image will include a copy of the trace buffer. Preferably, the trace buffer is in the CTC 114 so that the trace data is provided directly there. The CTC 114 preferably includes a large memory buffer for storage of these data structures. Storing the data to the CTC with an onboard memory buffer provides quick storage and collection of the trace buffer and bus transaction information.

The memory buffer can preferably be segmented into at least 10 separate memory buffers, providing enough flexibility to hold at least two capture banks. CTC 114 preferably contains logic to filter bus activity and store relevant bus activity into a memory buffer. A fast interface in the CTC preferably allows captured data to be quickly downloaded to an external system 18. The external system 18 may be equipped with a second CTC that receives the data downloaded from the first CTC.

The capture banks are preferably used in a circular fashion. In other words, if four banks are used, they are used in a circular order such as 1, 2, 3, 4, 1, 2, . . . . If only two banks are used, they are used in alternating fashion. This allows data to be transported to the external system in parallel with the acquisition of the data, but more importantly, this guarantees the accessibility of at least a half-buffer of data that was acquired before the detection of a fault. Although it is possible to continuously capture and transfer trace information to the remote system, it is generally preferred to simply capture data continuously, overwriting data in previously used banks as necessary, until an error is detected. Only after an error is detected are the contents of the CTC memory is transferred to the remote system.

Figure 6:
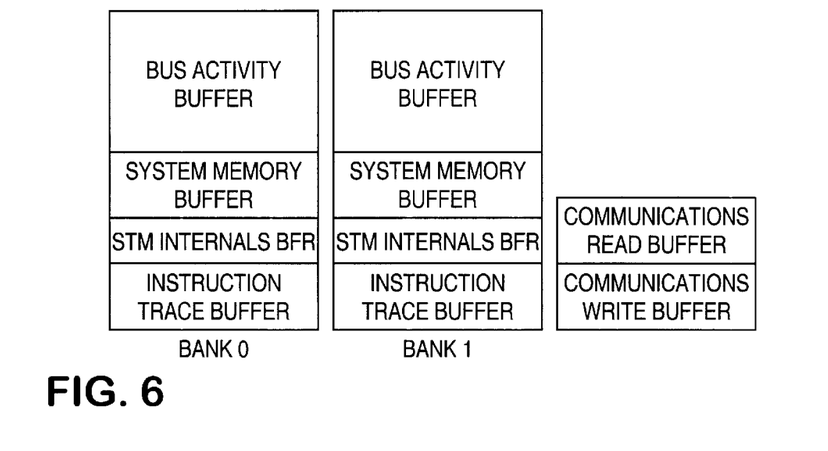

The preferred bank configuration of the CTC memory buffer is shown in FIG. 6. The memory is subdivided into 10 separate buffers. Two of the buffers (communications read buffer and communications write buffer) are used for communicating control and status information between the software on each system. The eight remaining buffers are defined as two banks of four buffers each. The four buffers are for PCI Activity, System Memory, System Internals, and instruction trace data. A set of registers is associated with each buffer for controlling the buffer region. Each register set is contains Base Address, Address Limit, Write Address Offset, Trigger Address, CheckSum, Control, and Status Registers. Once one of the buffers in a bank becomes full, an interrupt is performed and the processor provides a copy of its internal register settings to the buffer in that bank, initiates a memory image snapshot to that bank, and opens the next bank for capturing subsequent activity.

The organization into at least two banks is motivated by the desire to retain at least some predetermined minimum amount of pre-error event data. Typically errors are identified upon occurrence due to an immediate effect (system crash), or they are identified by the system management interrupt routine that initiates the memory image snapshot and copies the internal register contents to the CTC. Since the memory buffer holds two banks, the error is identified while there is still a pre-error memory image snapshot in memory, along with at least one bank of pre-error trace information. If desired, the system can be halted and the contents of the two banks transferred to the external system for analysis.

The CTC is a single unit that performs multiple functions. Namely, the CTC captures bus activity, stores trace information, and exports the trace information to an external system. In an exemplary implementation, a buffer size of 512 MB may hold from 5–20 seconds of internal system activity, and an external system interface operating at 132 MB/sec allows the contents of the memory buffer to be transferred to the external system in 2–4 seconds. The internal system activity can consequently be continuously captured and transported to an external system without reducing the performance of the system under test (except for the performance penalties normally incurred by enabling the instruction trace circuitry on the processor). This is particularly important when studying the performance of the system under test as it operates as part of a larger system (e.g. a computer network) that is intolerant of changes to the system timing. Also, capture lengths of 5 seconds or more provide enough time for manual triggering after a failure is witnessed without requiring a trigger point to be determined beforehand.

For automated triggering, the software routine that initiates the memory image captures is set up to trigger the CTC transfer upon detecting the failing condition. The system is then run until the failure is detected, and no trigger point before the failure is required. In operation, the software routine begins by capturing a system memory snapshot to the CTC and then exits. As the system runs, the trace information is stored to the CTC and the CTC captures relevant bus activity. When one of memory banks becomes full, a trigger wakes up the software routine, which then toggles the Bank Select (assuming two Banks), takes a new system memory snapshot, and exits. The CTC captures the trace information and bus activity to the new bank until one of its buffers is full and another trigger wakes up the software routine. This process is repeated until a failure is detected. The final capture is then downloaded to the external system and analyzed. By providing two banks of capture buffers and toggling between them, one can guarantee that at least half of the total buffer depth will contain pretrigger data when a trigger occurs.

Figure 3:
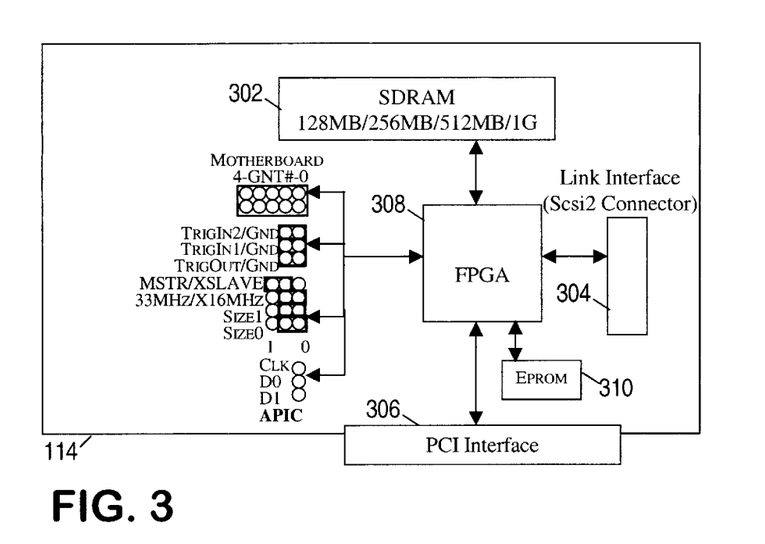
FIG. 3 is a functional block diagram of a preferred embodiment of a capture and transport card (CTC)

Referring now to FIG. 3, a preferred embodiment of CTC 114 is shown having slots for holding 128 MB to 1 GB of synchronous dynamic random access memory (SDRAM) 302. A Link interface 304 allows for communications with external system 18. In one implementation, the link protocol is a modified subset of the PCI protocol and uses a SCSI2 cable for its physical interface. A bus interface 306 allows for monitoring of the internal activity of the system under test 12. The bus interface is shown as a PCI interface, but it may also be an interface to the local processor bus which could be, e.g., a lightning data transport (LDT) bus. Coupled between the memory 302, the external interface 304, and the bus interface 306, is an application specific integrated circuit (ASIC) or field-programmable gate array (FPGA) 308 that implements the desired operations of the CTC 114. The circuit 308 will have configuration parameters that are set using jumpers or values stored in an electrically programmable read only memory (EPROM) 310.

The Size(1:0) jumpers configure the card for the appropriate memory size. The 33 MHz/X16 MHz jumper configures the clock speed of link interface 304. The MSTR/XSLAVE jumper configures CTC 114 as a bus master or slave on the link interface. The TrigIn1/2 pins have programmable polarity and can be internally enabled or disabled. They are logically OR'ed together along with other internal trigger events to generate the TrigOut event. The TrigOut pin is connected to SMI# on the motherboard. It also has a programmable polarity and can be internally enabled or disabled. The motherboard GNT# pins on the CTC 114 are connected to the GNT# lines on the motherboard. The GNT# line for the SouthBridge is the least significant bit, followed by the GNT# lines for PCI Slot #1, #2, #3, and #4 respectively, with PCI Slot #4 as the most significant bit. The state of the GNT# pins are used by the CTC to filter the irrelevant PCI data and are also captured as part of the PCI data activity.

The preferred embodiment of CTC 114 is capable of capturing selected PCI activity and storing it in a memory buffer. At any one time, the CTC is configured to capture eight distinct types of PCI events. Eight sets of PCI Activity registers are used to select these events. In addition, two additional sets of registers are used to select start and end triggering events that start and end the PCI activity capture. Typically, the start and end trigger events are Port 80 writes (with start/end data values) generated by the SMM software handler.

In the preferred embodiment, the CTC is further provided with three advanced programmable interrupt controller (APIC) pins connected to the 3-wire APIC interface on the motherboard. CTC 114 is capable of capturing APIC activity and storing it to the PCI Activity Buffer, interleaved with the PCI activity. The PCI Activity Start and End events also control the starting and ending of the APIC capture.

Figure 4:
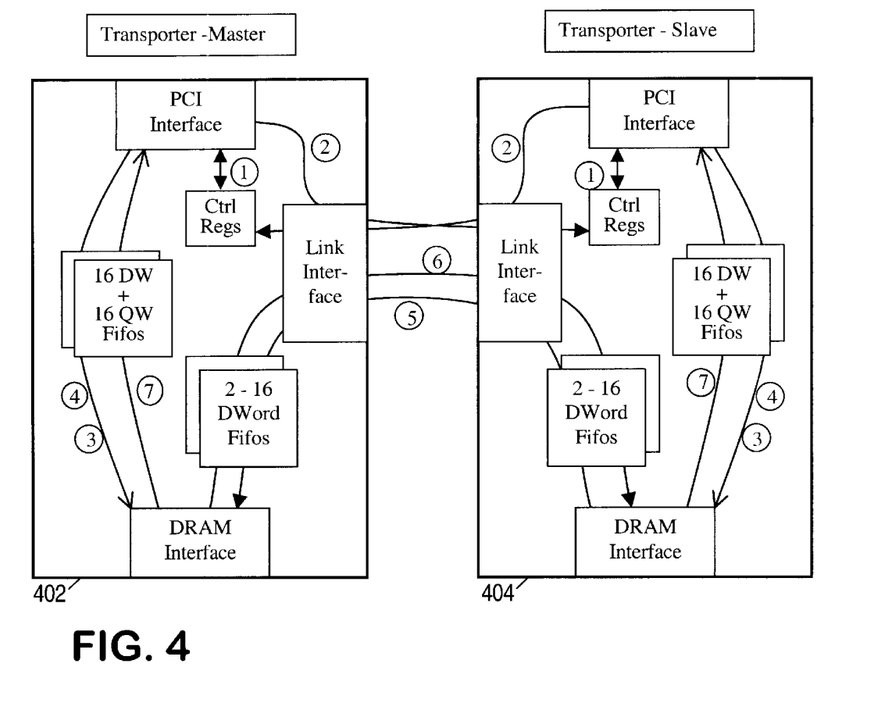
FIG. 4 is a diagram showing various communication pathways through coupled CTCs.

The preferred embodiment of CTC 114 is also capable of acting as the interface card in the external system 18. FIG. 4 shows the set of data paths available to a pair of CTC's connected by their external interfaces. The CTC 402 in the system under test 12 has been jumpered as a master, and the CTC 404 in the external system 18 has been jumpered as a slave. The numbered circles indicate the possible data paths within and between the cards. The following describes each of the datapaths.

1. PCI Reads and Writes of Local CTC Registers—Software on either platform can access the control registers of its local CTC through PCI IO reads and writes to the card's Index and Data registers. Only 32-bit accesses are supported—other accesses will be ignored by CTC (DEVSEL#=1).

2. PCI Reads and Writes of Remote CTC Registers—Software on either platform can access the control registers of the CTC residing in the opposite (i.e., remote) platform. Access to the remote control registers is the same as to the local control registers, except the Remote bit is set in the Index register. Software should verify that the remote card is active (by reading the remote powered status bit, RPwrd) before attempting to access any remote registers. A remote register access causes an IO read/write to occur on the Link interface, which will in turn read or write the appropriate register on the remote device. Only 32 bit accesses are supported—other accesses will be ignored by CTC (DEVSEL#=1).

3. Transfer Captured PCI and APIC Activity to Memory Buffer—Either CTC can be set up to monitor the PCI bus and capture the activity specified by the PCI Activity Selection registers. PCI activity is captured between a start event and an end event, their values having been set up in the PCI Activity Selection registers. The activity is captured into a 16 QWord FIFO until it can be written into one of the two PCI Activity buffers residing in CTC DRAM. The data values are added to the buffer's checksum register as the data is also written into DRAM.

CTC can capture APIC activity along with the PCI activity. As an APIC transaction completes, an APIC QWord will be written into the PCI Activity FIFO. The APIC QWords are interleaved with the PCI Activity QWords in the QWord FIFO as they occur. Both PCI and APIC activity are stored in the PCI Activity Buffer. The CTC must be designed to empty the QWord FIFO to DRAM faster than the activity from the APIC and PCI bus can fill it. If any transactions are lost due to an overflow in the FIFO, the Activity Overflow bit, ActOv, will be set.

4. PCI Memory Writes to Buffers—The CTC requests 32 MB of PCI memory address space. The Test Platform uses PCI memory writes for writing data into the trace buffer, System Memory image buffer, and System Internals buffers. Both the Test and the Control Platforms use PCI memory writes to write to their Communication Write buffer (which is used for communicating with the software on the opposite platform).

PCI memory writes that occur to any address within the 32 MB address space requested by the CTC will cause data to be stored in the next available location of the active memory buffer. A memory buffer is active when its buffer number is written into the PciMem(3:0) bits of the CTC Control Register. After each write, the active memory buffer will autoincrement its Write Address Offset Register to point to the next available location. PCI memory writes are stored in a 16-DWord FIFO until they can be written to DRAM. Only 32-bit writes are supported—non 32-bit writes will be ignored by CTC (DEVSEL#=1).

5. Memory Buffer Transfers from Slave to Master—The slave CTC is able to transfer buffers across the Link interface to a corresponding buffer on the master CTC. Typically, the only buffer that is transferred from the slave (Control Platform) is the Communication Write buffer. It is transferred into the Communication Read buffer on the master (Test Platform) and used for communicating control information to the software on the Test Platform.

On the slave side, the DRAM interface fills one of the 16-Dword FIFOs as the Link interface transfers data from the other. On the master side, the Link interface fills one of the 16-Dword FIFOs as the DRAM interface transfers data from the other.

6. Memory Buffer Transfers from Master to Slave—Analogous to the Slave to Master Buffer Transfer. The same FIFOs are used, but data is transferred in the opposite direction. Typically, the master (Test Platform) transfers the SystemMemory, System Internals, trace history, PCI Activity, and Communication Write buffers to corresponding buffers in the slave.

7. PCI Memory Reads from Buffers—After data has been stored into a buffer, it can be read back out through the PCI bus by PCI memory reads. PCI memory reads that occur to any address within the 32 MB address space requested by the CTC will cause the data pointed to by the Read Address Offset register to be read. The Read Address Offset Register will be autoincremented after each read to point to the next data location. Only 32 bit reads are supported—non 32-bit reads will be ignored by CTC (DEVSEL#=1).

The software on the Control Platform (slave) will read the System Memory, System Internals, trace history, and PCI Activity buffers with PCI memory reads and store the results to files on the hard disk. The software on both platforms will read their respective Communication Read buffers with PCI memory reads.

The CTC is reset by the RST# signal on the PCI bus; however, only the standard PCI Configuration Registers and the CTC Control Register will be reset. All other Indexed Registers and the CTC DRAM will be unaffected by the reset. System software is responsible for initializing the memory and Indexed Registers. This provides a means for recovering the data in the memory buffers after a system lockup.

A 64-bit checksum, comprised of 32-bit additions, is generated as data is saved into a memory buffer. As the data is transferred across the Link Interface, another checksum is generated on the remote device as the data is written into the remote device's buffer. By comparing the checksum of the local device and the remote device, software can determine if data integrity was maintained for the transfer.

As data is transferred across the Link Interface, one side of the interface generates parity as it transmits the data while the other side of the interface checks the parity. Any parity errors that occur over the interface cause the Parity Error Counter on the receive side to be incremented. Since a checksum is only valid after the entire buffer is transferred, the parity error checking provides a means for error checking smaller transfers. Software can use this as a means to transfer partial buffers and retransmit any data that contains parity errors. The checksum can then be used as a final check to validate the entire buffer transfer.

The CTC is capable of capturing APIC activity and selected PCI activity. The APIC activity is collected through the 3-wire APIC interface on the CTC. The PCI activity is collected through the PCI interface of the CTC and the GNT# lines on the card. Both APIC and PCI activity are captured into a 16 QWord FIFO until the data can be stored into the Activity buffer on the CTC DRAM. A Start event and an End event control the start and end of both types of captures. A capture is initiated by setting the StartCapture bit in the CTC Control register. If the ApicEn bit in this register is also set, then APIC activity will be captured along with the PCI activity.

A 32-bit activity counter is used to time stamp the captured data. The counter is reset when the StartCapture bit is set and begins counting when the Start Event occurs. The counter increments on each PCI clock. The lower 16 bits of the counter are stored along with each APIC and each PCI QWord, time stamping the activity. The upper 16 bits will increment roughly every 2 ms. Whenever the upper 16-bits change, a special QWord is written to the QWord FIFO (and thus to the Activity buffer) to record the new value.

For PCI activity, the PCI Activity Selection registers are used to specify the PCI activity to be captured. The data values in these registers are compared to the data on the PCI bus during the address phase (ie, on the falling edge of FRAME#, where: !FRAME# & FRAME#(PrevCycle)). If the present PCI address phase data matches the value in any of the eight selection registers, the address and data phase(s) are captured. All data phases are captured, including aborts. Therefore, data is captured whenever !IRDY# & (!TRDY#|!STOP#).

The QWords that are generated by the APIC and PCI activity capture logic and sent to the 16 QWord FIFO as defined as follows:

| Bit | Name | Description |
| --- | --- | --- |
| 63:61 | Type | Activity Event Type ( Type = 1h for PCI activity) |
| 60:56 | GNT#(4:0) | Indicates the current bus master device |
| 55:52 | FITS | Frame#, Irdy#, Trdy#, Stop# |
| 51:48 | C/BE#(3:0) | Cmd for address phases, Byte Enables for data phases |
| 47:32 | ActCtr(15:0) | The lower 16-bits of the activity counter |
| 31:0 | A/D(31:0) | Address for address phases, data for data phases |

For each time the upper 16-bits of the 32-bit activity counter changes:

| Bit | Name | Description |
|---|---|---|
| 63:61 | Type | Activity Event Type ( Type = 2h for activity counter) |
| 47:32 | ActCtr(31:16) | The upper 16-bits of the activity counter |

For APIC activity:

| Bit | Name | Description |
|---|---|---|
| 63:61 | Type | Activity Event Type ( Type = 3h for APIC activity) |
| 60 | EOI | 1 for EOI, 0 for normal transfers |
| 59 | DM | Destination Mode: 0 = physical, 1 = logical |
| 58:56 | M(2:0) | Delivery Mode: 000 = fixed, 001 = lowest priority, |
| Int | | 111 = 8259 |
| 55:48 | Vector(7:0) | Interrupt vector |
| 47:32 | ActCtr(15:0) | The lower 16-bits of the activity counter |
| 31 | L | Level bit: Init Deassert Message = 0, all other = 1 |
| 30 | TM | Trigger Mode: 0 = edge, 1 = level |
| 29:28 | A(1:0) | Report Status A |
| 27:26 | A1(1:0) | Report Status A1 |
| 25:24 | A2(1:0) | Report Status A2 |
| 23:16 | D(7:0) | Destination ID |
| 15:12 | ArbId1(3:0) | 1st Arbitration ID |
| 11:8 | ArbId2(3:0) | 2nd Arbitration ID |
| 7:0 | P(7:0) | Priority Bits |

The CTC occupies eight I/O locations (for addressing 2 DWord locations) in the system I/O map and 32 MB of contiguous memory in the system memory map. The memory and I/O base addresses are set by the system BIOS. The CTC is plug and play compatible.

The 2 IO Dword locations are used to access all of the CTC control registers. The first IO Dword addresses an Index register and the second IO DWord addresses a Data register. The CTC control registers are divided into three classes: Global registers, Memory Definition registers, and PCI Activity Selection registers To access a control register, the class and the index values of the control register are written into the Index register followed by a read or a write to the Data register. The Index register also contains a Remote bit. When the Remote bit is cleared, registers on the local CTC are accessed. Conversely, when this bit is set, the corresponding register on the remote CTC is accessed.

Two index registers are used for reading data from the various buffers. The Read Address Offset register contains the pointer to the next DWord to be read. The Read Address Limit register contains the upper limit of the current buffer being read. To read a buffer, that buffer's Base Address is loaded into the Read Address Offset register and its Limit Address is loaded into the Read Address Limit register. Then software performs 32-bit memory reads to any address in the 32 MB space recognized by the CTC. The Read Address Offset register is automatically incremented after each read to point to the next location to be read. The Read Address Offset register will cease to increment when the Read Address Limit is reached. Any further reads will result in a data value of zero being read back.

The Trigger Control register controls the operation of the TrigOut function. The TrigOut signal is connected to the SMI# pin on the motherboard. The TrigOut signal is active high for driving the SMI# pin through a pull-down transistor. Alternatively, TrigOut can drive SMI# directly by inverting TrigOut with the TrigOutInv bit.

TrigOut is a one-shot that creates an output pulse of 64 PCI clocks long whenever an active transition (edge triggered) event occurs on one of its inputs. TrigOut is the logical OR of 7 trigger inputs, categorized into three types. The first type is the external interrupt, comprised of two external trigger inputs, TrigIn1 and TrigIn2. Both of these signals are active high, but can be inverted with TrigIn1Inv and TrigIn2Inv. The second type is the Control register interrupt. The SetTrig bit in the CTC Control register will cause a trigger event on TrigOut. The third type is the memory buffer interrupt. Four of the memory buffers have a Trigger Address register and a TrigEn bit. If the TrigEn bit is set, then a trigger will be generated on TrigOut when the value in the Address Offset register reaches the value in the Trigger Address register. This trigger type is used to generate an SMI# when the memory buffer is nearly full.

The Trigger Control register also contains an EndDly bit. This bit allows the PCI Activity capture logic to continue capturing after an End event has occurred until the PCI bus is idle. This is needed because a DMA transfer may be in progress when the End event occurs, and the entire DMA transfer needs to be captured. The PciActDone bit will be set when the PCI activity capture is complete.

Other global registers include the CTC Control and Status registers that are used to initiate activity and report progress or errors. The Parity Error Counter is used during Link transfers to monitor the integrity of the Link interface.

The Memory Buffer Registers segment the CTC DRAM into up to ten separate buffers. The lower/upper limit of each buffer are defined by the Base Address/Address Limit registers. For example, a CTC with 512 MB of DRAM, could be segmented as follows:

| Buffer | Name | Size | Base Address | Address Limit |
|---|---|---|---|---|
| #9 | Communication Read Buffer | 64 KB | 00000000h | 0000FFFFh |
| #10 | Communication Write Buffer | 64 KB | 00010000h | 0001FFFFh |
| #1 | Bank 0 - Activity Buffer | 120 MB–64 KB | 00020000h | 0780FFFFh |
| #2 | Bank 0 - System Memory Buffer | 64 MB | 07810000h | 0B80FFFFh |
| #3 | Bank 0 - System Internals Buffer | 8 MB | 0B810000h | 0C00FFFFh |
| #4 | Bank 0 - Trace Buffer | 64 MB | 0C010000h | 1000FFFFh |
| #5 | Bank 1 - Activity Buffer | 120 MB–64 KB | 10010000h | 177FFFFFh |
| #6 | Bank 1 - System Memory Buffer | 64 MB | 17800000h | 1B7FFFFFh |

-continued

| Buffer | Name | Size | Base Address | Address Limit |
|---|---|---|---|---|
| #7 | Bank 1 - System Internals Buffer | 8 MB | 1B800000h | 1BFFFFFFh |
| #8 | Bank 1 - Trace Buffer | 64 MB | 1C000000h | 1FFFFFFFh |

The PCI Activity Selection registers provide a means for filtering the PCI activity that will be captured into the Activity buffer. Typically, memory reads (MemRds) and input/output reads (IORds) from the NorthBridge, memory writes (MemWrs) from the SouthBridge, and Interrupt Acknowledge cycles need to be captured. It may also be advantageous to see Port 80 Writes from the NorthBridge and MemWrs in the non-Video Address Range. To capture all of these cycles, the PCI Activity Selection registers would be set up as follows:

| | | | Selection Register | | |
|---|---|---|---|---|---|
| | Control Addr | Select Addr | Mask | Gnt/Cmd Select | Comment |
| #1 | 00000000 | 00000000 | FFFFFFFF | 001F5445 | NorthBridge Config Rds, MRMs, MRLs, MemRds, IoRds, IntAcks |
| #2 | 00000002 | 00000000 | FFFFFFFF | 001F8080 | MWI, MemWrs - all devices except NorthBridge |
| #3 | 00000000 | 00000080 | 00000000 | 001F0004 | Port 80 Writes from NorthBridge |
| #4 | 00000004 | 000A0000 | 0001FFFF | 001F8080 | NorthBridge all MemWrs except those to Video |

In the preferred embodiment, the Link Interface has been derived from the PCI protocol, modified to facilitate operation over a point-to-point cable interface. With the exception of the LREQ#/LGNT# pair and LTRDY#, all signals are driven by the initiator. This eliminates any timing problems associated with round-trip delays. In addition, the LCLK/2 is a half speed clock, resulting in a 132 MB/sec interface with all signaling at 16 MHz or below. The following table describes the Link Interface signals along with the device that drives the signal during a transfer and while the bus is idle:

| Link Signal | Driven By During Write | Driven By During Idle | Comment |
|---|---|---|---|
| LREQ# | Slave (Always) | To High by Slave | Control Platform is always the slave. |
| LGNT# | Master (Always) | To High by Master | Test Platform is always the master. |
| LCLK/2 | Current Initiator | To High by Master | |
| LFRAME# | Current Initiator | To High by Master | |
| LIRDY# | Current Initiator | To High by Master | |
| LTRDY# | Current Target | To Low by Slave | Low during idle when Slave is ready |
| LAD(31:0) | Current Initiator | To High by Master | |
| LC/PAR(3:0) | Current Initiator | To High by Master | |
| MPWRD | Master (Always) | To Low after PwrUp /Rst | Set high by master's software after master powered and initialized. |
| SPWRD | Slave (Always) | To Low after PwrUp /Rst | Set high by slave's software after slave powered and initialized. |

The Cmd Types supported by the Link Interface are as follows:

| CMD  | Type          | Comments                                                                                                                                                                                                                                                                |
|------|---------------|-------------------------------------------------------------------------------------------------------------------------------------------------------------------------------------------------------------------------------------------------------------------------|
| 0010 | IO Reads      | Issues a write that initiates a read request of the CTC control registers from the remote device. The write data indicates the number of bytes requested (always 4 bytes for CTC). The remote will respond with requested data using an IO Write to address 00030000h. |
| 0011 | IO Writes     | Used to write to the CTC control registers of the remote device.                                                                                                                                                                                                        |
| 0111 | Memory Writes | For Buffer Transfers                                                                                                                                                                                                                                                    |

The Link interface only supports 32-bit writes. The byte enables of the PCI protocol have been redefined as parity bits for each data byte. The transmit side of the interface will generate parity and the receive side will check parity, incrementing the Parity Error Counter register on the receive side if any parity errors occur.

The Link interface supports IO Reads and Writes in order to read and write the indexed control registers on the remote device. An IO Write results in an update of the remote device's control register. Since the Link Interface only supports writes, an IO Read is identical to an IO Write except that a data value indicating the number of bytes requested is transferred with the read. The remote device recognizes that an IO Read has occurred and will respond with its own IO Write (to address 00030000h) and requested data. The data will be transferred to a special remote IO Read register that holds the results of the read request. The CTC recognizes that the read request has been satisfied and forwards the register's value to the PCI interface. The PCI read request of a remote Configuration Register will result in Target Retries until the read register is loaded, at which time the read data will complete the request.

Figure 5:
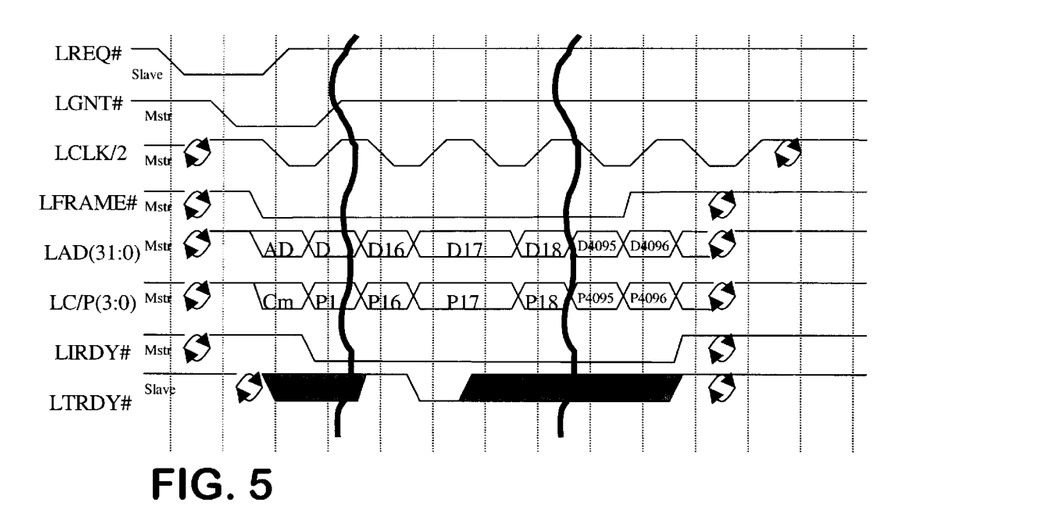
FIG. 5 is an illustrative timing diagram for communications between coupled CTCs.

An example of a Link Memory Write from Slave timing is shown in FIG. 5. Here, the slave initiates a memory write by first asserting the LREQ# signal at any time. The master will recognize the asynchronous transition on LREQ# and assert LGNT# if it has no pending writes to perform and the bus is idle. While the bus is idle, the master is responsible for driving all of the signals, except LREQ# and LTRDY#, to an inactive known state. Since the slave is the initiator in this example, the master will tri-state its drivers on these signals after recognizing the LREQ# assertion and before asserting LGNT#. The Slave will then drive these signals for four clocks (internal LCLKs) and then deassert LREQ#. The master will ignore any transitions on LCLK/2 until LREQ# is deasserted. The deassertion of LREQ# will cause the master to start driving the LTRDY# signal (the Slave tri-stated its LTRDY# driver on recognition of the LGNT# assertion). The slave is now prepared to start a transaction.

The LCLK/2 signal transitions on the rising edge of LCLK (internal to the slave device). All of the data and control signals driven by the slave transition on the falling edge of LCLK. The slave begins the transaction by asserting LFRAME# and driving the Address and Command bits. One half of a LCLK later, the first LCLK/2 transition occurs. The data flow follows the PCI protocol, except that the LTRDY# signal only has throttle points after every 16 clocks. (since the Slave and Master both have 16 DWord FIFOs). The target (Master in this case) should deassert LTRDY# as it switches FIFOs, and assert LTRDY# when the FIFO that is not currently being filled becomes empty. Once the transaction has completed, the Slave will tri-state its drivers on all signals except LREQ# on the clock after LIRDY# become inactive. The Master will tristate its LTRDY# driver at this same time. One more LCLK2 transition will occur, which will signal the Master to drive all of the signals except LREQ# and LTRDY# to an inactive state. The Slave will will also begin driving the LTRDY# signal to a state that indicates its readiness at this time.

Master to Slave writes occur in an analogous manner, however, no bus turnarounds occur and no REQ#/GNT# handshaking occurs. The master will wait for the bus to become idle (LFRAME#=1 and LIRDY#=1) and for a ready indication from the slave (LTRDY#=0) before beginning a transaction.

The system consists of two platforms, each containing a CTC. The two systems are connected via a cable attached to the Link Interface of each CTC. Since most of the data traffic occurs from the Test Platform to the Control Platform, the CTC in the Test Platform is always set up as the master.

Initialization (For Either Device):

1. Power-up or PCI RST# causes the PCI Configuration Registers 04h (Command), 10h (Base memory Address), 14h (Base I/O Address), and 3Ch (Interrupt Line) to be reset.
2. Power-up or PCI RST# also causes the CTC Control Register (Class 0, Index 00h) of the local device to be reset. The SetLPwrd bit in the CTC Control Register is connected to either the MPWRD signal (if the local device is a master) or the SPWRD signal (if the local device is a slave) on the Link Interface. As a result, resetting the CTC Control Register also resets MPWRD (for master) or SPWRD(for slave). Any Link transfer is terminated on the local device and the MPWRD/SPWRD deassertion causes the transfer to be terminated on the remote device. Any outstanding remote PCI Read request on either device is also terminated (the PCI Read will complete with invalid data being returned). All other Indexed registers and CTC DRAM is unaffected by PCI RST#.
3. The RPWRD bit in the CTC Status Register device reflects the state of either the SPWRD or MPWRD signal driven from the remote device. If a CTC is jumpered as a slave, then its RPWRD bit will reflect the state of the MPWRD signal. The converse is true if it is jumpered as a master. The CTC Status Register also contains a LPWRD bit; however this bit does not reflect the state of the local PWRD signal. Instead, this bit is zero at power-up and is set to one the first time the local PWRD signal is set (with SetLPwrd in the CTC Control register). PCI RST# will not reset the LPWRD bit. Therefore, the LPWRD bit can be used to determine if the reset was due to a powerup or due to a PCI RST#.
4. The system BIOS on the system being powered-up or reset will enumerate the PCI devices and assign values to the Base Memory Address register (10h), Base I/O Address register (14h), and Interrupt Line register (3Ch).
5. The device software sets the Command Register (04h) to 03h to allow the CTC to recognize the memory and IO ranges.
6. The device software reads the LPWRD bit. If clear, then the system has just been powered up, so all of the Index Registers are initialized. If set, then a PCI RST# has occurred and the Indexed Registers are left in their previous state. This provides a means for the Control Platform to download the buffers after the Test Platform has been reset following a lock-up.

7. The device software sets the SetLPwrd bit in the CTC Control register. This causes the local PWRD signal to be asserted and lets the remote device know that the local device is ready. If it is not already set, the LPwrd status bit is also set by SetLPwrd.

Accessing Local Configuration Registers:

The device software on either platform:

1. Writes the Index Register value and Register Class into the Index Register with the remote bit cleared.
2. Reads/writes the Data Register, which will access the local register directly.

Accessing Remote Configuration Registers

The device software on either platform:

1. Reads the CTC Status register and checks the RPWRD bit. If the RPWRD bit is set, the remote access can occur. Otherwise, the device software should issue an error message indicating that the remote device is not ready.
2. Writes the Index Register value and Register Class into the Index Register with the remote bit set.
3. Reads/writes the Data Register. The access will be forwarded to the Link Interface. If a remote control register access is already pending, the CTC will terminate any new requests with a target retry until the pending access is complete. Remote IO reads will result in target retries until the data is available from the remote device. Any remote control register access that occurs when the RPwrd bit is inactive will result in a completed read or write on the PCI bus, with invalid data being returned on reads and no actual write being performed on the remote device.

Set up for PCI and APIC Activity Capture

The device software on either platform:

1. Sets up the PCI Activity Selection Registers on the Test Platform to monitor PCI activity. Typically, the software on the Control Platform will set up these resigsters via remote register access.
2. Sets up the Start/End Events in the PCI Activity Start/End Event Registers.
3. Sets the ApicEn bit, if APIC activity will be captured.
4. Set the MemBank bit to proper value. This determines whether the captured activity will be sent to Activity Buffer #0 or #1.
5. Sets the TrigEn bit and sets the Trigger Address register to a few QWords less than the Address Limit. This will cause an SMI# event when the Activity Buffer gets full.
6. Sets the StartCapture bit in the CTC Control register. Once this bit is set, the CTC waits for the Start Event, then captures all selected activity until the End Event occurs and the PCI Bus is idle for 128 Clocks (if the EndDly bit in the Trigger Control register is set). CTC hardware will set the CaptureDone bit in the CTC Status register when the capture has finished.

Storing Data to Memory Buffers via PCI Writes

The device software on either platform for the memory buffer of interest:

1. Clears the Low CheckSum and High CheckSum registers by writing a value of zero into these registers. The Base Address and Address Limit registers should have already been set up during device initialization.
2. Reads the Base Address and writes the Write Address Offset Register with the Base Address value. This sets the write pointer to the beginning of the buffer space.
3. For a instruction trace buffer, if trace data will be sent directly to the CTC, the software can set up the Trigger Address register and TrigEn bit to trigger SMI# when the buffer gets full. Alternatively, the processor can also generate its own interrupt when it detects that the trace buffer is full (this is the preferred method).
4. Writes the value of the memory buffer into the PciMem (3:0) bits of the CTC Control register.
5. Performs 32-bit memory writes to the CTC memory space. A memory write to any address in the CTC's address range will cause the data to be written to the next available location in the memory buffer and cause the Write Address Offset register for that buffer to be incremented. As each value is written, the data is also added to the value in the 64-bit checksum register.

Memory Buffer Transfers

The device software of the local device transferring data to the remote device:

1. The software polls the RPwrd bit in its local CTC Status Register and generates an error message if the remote device is not powered.
2. For the remote device's memory buffer registers: Clears the CheckSum registers and sets the Write Address Offset register equal to the Base Address register. This initializes the buffer for a transfer.
3. Reads the Base Address Register of the memory buffer to be transferred and writes the Base Address value to the local Read Address Offset Register. This sets up the starting address of the transfer. The value will be automatically incremented as the data is transferred until the Read Address Limit register value is reached.
4. Reads the Write Address Offset value of the memory buffer to be transferred and writes the value to the local Read Address Limit Register.
5. Writes the LinkMem(3:0) value in the remote device.
6. Sets the LinkIntEn bit to proper values in both devices.
7. Initiates the Link transfer by setting the StartLink bit in the local device's CTC Control register.
8. Either waits for the Link interrupt (LinkIntEn=1) or polls the LinkDone bit in the CTC Status register.
9. Clears the LinkDone bit by writing a value a one into it.

Reading the Memory Buffer

The device software on either platform:

1. Validates that the data is correct by checking the value in the local Checksum register against the value in the remote Checksum register for the same memory buffer.
2. Reads the Base Address Register of the memory buffer to be transferred and writes the Base Address value to the Read Address Offset Register.
3. Reads the Write Address Offset value of the memory buffer to be transferred and writes the value to the Read Address Limit Register.
4. Performs 32-bit memory reads to the CTC memory space. A memory read to any address in the CTC's address range will cause the data to be read from the next available location in the memory buffer and cause the Read Address Offset Register to be incremented.

Registers:

| Bit | Name | Description |
|---|---|---|
| | | Command register (Offset 04h) |
| 15:2 | Rsvd | 0's |
| 1 | I/O Enable | Enables I/O space when set to one by system software. |
| 0 | Mem Enable | Enables Memory space when set to one by system software. |
| | | Base Memory Address register (Offset 10h) |
| 31:25 | Base Mem Address | Base Address for 32 MB of memory space. |
| 24:0 | Fixed at 0000008h | bit 3 = 1 indicates that the memory is prefetchable and mergeable. bit 2:1 = 00 indicates that the memory can be located anywhere in 32-bit address space. bit 0 = 0 indicates the base address refers to memory address space. |
| | | Base I/O Address register (Offset: 14h) |
| 31:16 | Rsvd | 0's |
| 15:4 | Base IO Address | Base Address for 8 bytes (2 DWords) of IO space. |
| 3:0 | Fixed at 1h | bit 3 = 0 indicates that the IO addresses are not prefetchable and meregable. bit 2:1 = 00 indicates that the IO can be located anywhere in 32-bit address space. bit 0 = 1 indicates the base address refers to IO address space |
| | | Interrupt Line register (Offset: 3Ch) |
| 7:0 | Interrupt Value | |
| | | Index Register (Offset: 00h from base I/O address) |
| 31:19 | Rsvd | |
| 18 | Remote | |
| 17:16 | Class | 0h = Global Registers, 1h = Memory Buffer Registers, 2h = Pci Activity Selection Registers, 3h = Remote Read Response |
| 15:0 | Index Register Value | Used to select the source/destination of the Data register for I/O reads and writes. |

Global Registers (Class 0)

| Class | Index | Name |
|---|---|---|
| 0 | 00h | CTC Control register |
| 0 | 01h | CTC Status register |
| 0 | 02h | Trigger Control register |
| 0 | 03h | Read Address Offset register |
| 0 | 04h | Read Address Limit register |
| 0 | 05h | System Tracker Communication register |
| 0 | 06h | Parity Error Counter |

Memory Buffer Registers (Class 1)

| Buffer | Class | Index | Name |
|---|---|---|---|
| #1 | 1 | 00h–07h | Bank 0 - Activity Buffer |
| #2 | 1 | 10h–16h | Bank 0 - System Memory Buffer |
| #3 | 1 | 20h–26h | Bank 0 - System Internals Buffer |
| #4 | 1 | 30h–37h | Bank 0 - BHT Buffer |
| #5 | 1 | 40h–47h | Bank 1 - Activity Buffer |
| #6 | 1 | 50h–56h | Bank 1 - System Memory Buffer |
| #7 | 1 | 60h–66h | Bank 1 - System Internals Buffer |
| #8 | 1 | 70h–77h | Bank 1 - BHT Buffer |
| #9 | 1 | 80h–86h | Communication Read Buffer |
| #10 | 1 | 90h–96h | Communication Write Buffer |

| Set | Class | Index | Name |
|---|---|---|---|
| #1 | 2 | 00h–04h | PCI Activity Selection #1 |
| #2 | 2 | 10h–14h | PCI Activity Selection #2 |
| #3 | 2 | 20h–24h | PCI Activity Selection #3 |
| #4 | 2 | 30h–34h | PCI Activity Selection #4 |
| #5 | 2 | 40h–44h | PCI Activity Selection #5 |
| #6 | 2 | 50h–54h | PCI Activity Selection #6 |
| #7 | 2 | 60h–64h | PCI Activity Selection #7 |
| #8 | 2 | 70h–74h | PCI Activity Selection #8 |
| #9 | 2 | 80h–86h | PCI Activity Start Event |
| #10 | 2 | 90h–96h | PCI Activity End Event |

| Bit | Name | Description |
|---|---|---|
| | | Data Register (Offset 04h: from base I/O address) |
| 31:0 | Register Data | Used to communicate with the Indexed registers, data source/destination selected by the Index register |
| | | CTC Control Register (index 00h) |
| 31:28 | PciMem(3:0) | PCI to Memory Selection. Selects the memory buffer to be written by the local PCI bus. |
| 27:24 | LinkMem(3:0) | Link to Memory Selection. Selects the memory buffer to be loaded from the Link Interface. |
| 23 | MemBank | Memory Bank. Sets the memory bank that is currently active. The PCI Activity logic uses this to determine which bank to store its data to. |
| 22:7 | Rsvd | |
| 6 | ApicEn | APIC Activity Enable. Enables the capture of activity on the APIC interface. This activity is captured to the Activity buffer and is only captured between PCI Activity Start and End Events. |
| 5 | StartCapture | Start Capture. Enables the Start of an APIC and/or PCI Activity Capture. Setting this bit resets the activity counter. Capture will begin when Start Event occurs. This bit is automatically reset when the Start Event occurs. |
| 4 | LinkIntEn | Link Interrupt Enable. A 0 to 1 transition on LinkDone (CTC Status register) will cause an interrupt to be generated when this bit is set. |
| 3 | SetInt | Set Interrupt. Causes an interrupt to be generated immediately. This bit is automatically reset when the interrupt occurs. |
| 2 | SetTrig | Set Trigger. Causes an assertion of TrigOut. This bit will automatically be reset when TrigOut asserts. |
| 1 | StartLink | Start Link. Initiates the transfer of the memory buffer across the Link interface. This bit is automatically cleared when the Link transfer begins. |
| 0 | SetLPwrd | Set Local Powered signal. Sets the SPWRD signal (if jumpered as Slave) or the MPWRD signal (if jumpered as Master). Also sets the LPWRD bit in the CTC Status register. Once set, this bit remains set until reset by a PCI RST# or power is lost. |
| | | CTC Status register (index 01h) |
| 31:11 | Rsvd | |
| 9 | ActOv | Activity Overflow. Error Flag to indicate that the Activity FIFO has overflowed. |
| 8 | SWAct | Software Active. This bit is set by the local device software when it wakes up and reset just before it exits. The value of the bit is toggled each time a one is written into it. |
| 7 | ManTrig | Manual Trigger. Set by trigger logic if TrigOut was caused by the SetTrig Control bit. This bit is reset by writing a one to it. |
| 6 | ExtTrig | External Trigger. Set by trigger logic if TrigOut was caused by TrigIn1 or TrigIn2. This bit is reset by writing a one to it. |
| 5 | MemTrig | Memory Trigger. Set by trigger logic if TrigOut was caused by one of the memory buffer triggers. This bit is reset by writing a one to it. |
| 4 | MsgPend | Message Pending. This bit is set by the device software before issuing an interrupt or trigger (with SetInt or SetTrig) associated with communication messages. This bit is reset by writing a one to it. |
| 3 | ActDone | Activity Done. Set by Activity capture logic after capture has completed. This bit is reset by writing a one to it. |
| 2 | LinkDone | Link Done. The Link transfer from/to the local device has completed. This bit is reset by writing a one to it. |

-continued

| | | |
|---|---|---|
| 1 | LPwrd | Local Powered. The Local Device is Powered Up and Ready. Once set, this bit is never reset. It does not necessarily reflect the state of the xPWRD signal, since that signal is reset by PCI RST#. |
| 0 | RPwrd | Remote Powered. The Remote Device is Powered Up and Ready. This bit reflects the state of the SPWRD signal (if jumpered as Master) or the MPWRD signal (if jumpered as Slave). |

Trigger Control Register (index 02h)

| | | |
|---|---|---|
| 31:7 | Rsvd | |
| 6 | EndDly | End Delay. Continue PCI Activity capture after End Event until the PCI bus has been idle for 128 clocks. |
| 5 | TrigOutInv | Trigger Out Invert. Inverts TrigOut to active low assertion |
| 4 | TrigIn2Inv | Trigger In2 Invert. Inverts TrigIn2 input to active low Assertion |
| 3 | TrigIn1Inv | Trigger In1 Invert. Inverts TrigIn1 input to active low assertion |
| 2 | TrigOutEn | Trigger Out Enable. Enables TrigOut. |
| 1 | TrigIn2En | Trigger In2 Enable. Enables TrigIn2. TrigIn2 will be ignored if bit is cleared. |
| 0 | TrigIn1En | Trigger In1 Enable. Enable TrigIn1. TrigIn1 will be ignored if bit is cleared. |

Read Address Offset Register (Index 04h)

31:0 Address pointer to next read data for PCI Reads and Link Transfers

This register is loaded with the Base Address value of the memory buffer to be transferred or read. It will be autoincremented after each read until the Read Address Limit register value is reached. The value points to the next CTC DRAM address to be read.

Read Address Limit Register (Index 05h)

31:0 Address pointer to last valid data.

This register is loaded with the Write Address Offset value of the memory buffer to be transferred or read. The Link Transfer will terminate when the Read Address Offset reaches the Read Address Limit value. If further PCI reads occur after the Read Address Offset register reaches the Read Address Limit value, the data returned will be all zeros.

Communication Register (Index 06h)

31:0 Bit definitions differ for master and slave

This register is used to communicate software commands and status information. This register is used in conjunction with the Communication Read/Write buffers. Since the definition of these bits only affect software, the bit definitions are not defined in this document.

| Bit | Name | Description |
|---|---|---|
| Parity Error Counter register (index 07h) | | |
| 31:16 | Rsvd | |
| 15:0 | ParErrCnt(15:0) | |

This register is a 16-bit counter that is incremented each time a parity error is received from the Link Interface. The register is cleared by writing a value of zero into it.

Memory Buffer Control Register (index 0h)

| | | |
|---|---|---|
| 31:1 | Rsvd | |
| 0 | TrigEn | Trigger Enable. A value of 1 causes an SMI# event to be generated when the Address Offset Register value reaches |

-continued

| Bit | Name | Description |
|---|---|---|
| | | the Trigger Address value. This bit is only defined for PCI Activity and trace information buffers. |

Memory Buffer Status Register (index 01h)

| | | |
|---|---|---|
| 31:0 | Rsvd | No Status bits have been defined at this time. |

Memory Buffer Base Address Register (index 02h)

| | | |
|---|---|---|
| 31:16 | Base Address of Memory Region | (64K Aligned) |
| 15:0 | Rsvd | (0000h) |

The Base Address Register contains the absolute address of the first valid CTC DRAM address in the memory set.

Memory Buffer Address Limit Register (index 03h)

| | | |
|---|---|---|
| 31:16 | Limit Address of Memory Region | (64K Aligned-1) |
| 15:0 | Rsvd | (FFFFh) |

The Address Limit Register contains the absolute address of the last valid CTC DRAM address for the memory set. When the address counter reaches the Address Limit value, any further writes to the buffer will be discarded. This prevents one memory buffer from invading another.

Memory Buffer Write Address Offset Register (index 04h)

| | | |
|---|---|---|
| 31:2 | Pointer to end of valid data | (Value-1 = Last byte of valid data written from PCI port) |
| 1:0 | Rsvd (0h) | |

The Write Address Offset Register contains an absolute address of the next address to be written. It is automatically incremented after each PCI write. Software should initialize the Write Address Offset Register by reading the Base Address Register, then writing the Write Address Offset Register with the same value. PCI Reads and Link transfers do not increment the Address Offset Register.

Memory Buffer Low CheckSum Register (Index 05h)

31:0 Checksum of all valid data (summed 32-bits at a time)—Low DWord

The Low CheckSum Register contains the Low Dword of the 64-bit checksum register. The CTC hardware calculates the checksum by adding to the current 64-bit checksum each 32-bit value written to the memory buffer. The Low and High CheckSum Register should be cleared by software before the memory buffer is written.

Memory Buffer High CheckSum Register (Index 06h)

31:0 Checksum of all valid data (summed 32-bits at a time)—High DWord

The High CheckSum Register contains the High Dword of the 64-bit checksum register.

Memory Buffer Trigger Address Register (Index 07h)

31:2 Causes TrigOut to be asserted when Address Offset= Trigger Address Value 1:0 Rsvd (0h)

For writes to the Memory Buffer, the Trigger Address Register will generate a TrigOut event when the Address Offset Register value matches the value in the Trigger Address register if the TrigEn bit has been set. Only the BHT and PCI Activity Buffers have this register.

| Bit | Name | Description |
|---|---|---|
| PCI Activity Control (index 0h) | | |
| 31:3 | Rsvd | |
| 2:0 | Not | Bit 2-Not Address Select (Selects all Addresses outside |

-continued

PCI Activity Control (index 0h)

| Bit | Name | Description |
|---|---|---|
| | | selected range)<br>Bit 1-Not GNT# Select (Selects all GNT# except GNT# value)<br>Bit 0-Not CMD# Select (Selects all CMD# except CMD# value) |

PCI Activity Address Select (Index 1h)
  31:0 32-bit PCI Address
    Contains the PCI Address used to determine whether or not the PCI transaction will be captured.
PCI Activity Address Mask (Index 2h)
  31:0 PCI Address Mask (1=Bit Masked)
    This register allows bits of the selected address to be masked, allowing a range of PCI addresses to be captured. Combined with the Not Address Select bit, a range of addresses can be excluded from capture.

PCI Activity Gnt/Cmd Select (index 3h)

| Bit | Name | Description |
|---|---|---|
| 31:26 | Rsvd | |
| 25:21 | Gnt#(4:0) Mask | A one bit masks the respective GNT# signal, making the signal a don't care in the comparison. |
| 20:16 | Gnt#(4:0) | These bits allow PCI filtering based on the external GNT# lines, allowing activity from specific devices to be captured. |
| 15:0 | Cmd Type | A one in one of the 16 bits allows the respective PCI Cmd Type to be captured. Setting multiple bits allows groups of Cmd Types to be captured. Alternatively, Cmd Types or groups of Cmd Types can be excluded by also setting the Cmd Type NOT bit in the PCI Activity Control Register. |

PCI Activity Data Select (Start Event/End Event registers only) (Index 4h)
  31:0 D(31:0)
    This register only exists for the Start Event and End Event registers. It allows the user to specify the exact data value required in the data phase in order to start or end a capture.
PCI Activity Byte Enable Select (Start/End Event registers only) (Index 5h)
  31:4 Rsvd
  3:0 BE#(3:0)
    This register only exists for the Start Event and End Event registers. It allows the user to specify the size of the data required in the data phase in order to start or end a capture.

Numerous variations and modifications will become apparent to those skilled in the art once the above disclosure is fully appreciated. It is intended that the following claims be interpreted to embrace all such variations and modifications.

What is claimed is:

1. An apparatus for capturing and transferring internal system activity, wherein the apparatus comprises:
  a bus interface configured to connect to the internal system bus;
  a memory configured to store information indicative of internal system activity;
  an external interface configured to couple to an external system;
  circuitry coupled between the bus interface, the memory and the external interface, wherein the circuitry is configured to partition the memory into at least two banks each having a plurality of buffers, wherein said plurality of buffers includes a buffer for instruction trace information, and wherein the circuitry is configured to switch banks in response to a currently active bank becoming full.

2. The apparatus of claim 1, wherein said plurality of buffers includes a buffer for system memory images, and wherein when one of said plurality of buffers in a current bank is full, the buffer for system memory images is provided with current contents of a system memory before a bank switch is made.

3. The apparatus of claim 1, wherein said plurality of buffers includes a buffer for internal processor data, and wherein when one of said plurality of buffers in a current bank is full, the buffer for internal processor data is provided with current internal processor settings before a bank switch is made.

4. The apparatus of claim 1, wherein said plurality of buffers includes a buffer for bus activity, wherein the bus interface is configurable to capture and store bus activity into this buffer.

5. The apparatus of claim 1, wherein the circuitry is configurable to transmit the contents of the memory banks to the external system via the external interface.

6. A testing assembly providing monitoring of internal activity of a system under test, wherein the testing assembly comprises:
  a monitoring system; and
  a system under test that includes:
    a system memory;
    a processor coupled to the system memory and configured to perform executable software instructions contained therein;
    an internal system bus coupled to said processor and configured to couple the processor to expansion connectors;
    a capture and transport apparatus connected to one of said expansion connectors, said apparatus having:
      a bus interface coupled to the internal system bus;
      a memory;
      an external interface coupled to the monitoring system;
      a circuit module coupled between the bus interface, the memory and the external interface, wherein the module is configured to partition the memory into at least two banks each having a plurality of buffers, wherein said plurality of buffers includes a trace buffer, and wherein the processor configures the circuit module to switch banks if any buffer in a current bank becomes full.

7. The assembly of claim 6, wherein the processor periodically exports instruction trace information to the capture and transport apparatus for storage in the trace buffer of a current bank.

8. The assembly of claim 7, wherein said plurality of buffers includes a system memory image buffer, wherein before bank switches occur, the processor provides current contents of the system memory to the system memory image buffer of the current bank.

9. The assembly of claim 8, wherein said plurality of buffers includes a processor data buffer, and wherein before bank switches occur, the processor writes current internal processor settings to the processor data buffer of the current bank.

10. The assembly of claim 9, wherein said plurality of buffers includes a bus activity buffer, wherein the bus interface is configurable to capture and store bus activity into this buffer.

11. The assembly of claim 10, wherein the circuit module is configurable to transmit the contents of the memory banks to the monitoring system via the external interface.

12. A testing assembly providing monitoring of internal activity of a system under test, wherein the testing assembly comprises:
- a monitoring system; and
- a system under test that includes:
  - a system memory;
  - a processor coupled to the system memory and configured to perform executable software instructions contained therein;
  - an internal system bus coupled to said processor and configured to couple the processor to expansion connectors;
  - a capture and transport apparatus connected to one of said expansion connectors, said apparatus having:
    - a bus interface coupled to the internal system bus;
    - a memory;
    - an external interface coupled to the monitoring system;
    - a circuit module coupled between the bus interface, the memory and the external interface, wherein the module is configured to partition the memory into at least two banks each having a plurality of buffers, wherein said plurality of buffers includes a trace buffer, and wherein the processor configures the circuit module to switch banks if any buffer in a current bank becomes full;
  - wherein the processor periodically exports instruction trace information to the capture and transport apparatus for storage in the trace buffer of the current bank;
  - wherein said plurality of buffers includes a system memory image buffer, wherein before bank switches occur, the processor provides current contents of the system memory to the system memory image buffer of the current bank;
  - wherein said plurality of buffers includes a processor data buffer, and wherein before bank switches occur, the processor writes current internal processor settings to the processor buffer of the current bank;
  - wherein said plurality of buffers includes a bus activity buffer, wherein the bus interface is configurable to capture and store bus activity into this buffer;
  - wherein the circuit module is configurable to transmit the contents of the memory banks to the monitoring system via the external interface;
  - wherein the monitoring system includes a second capture and transport apparatus having an external interface coupled to the external interface of the first capture and transport apparatus, wherein the second capture and transport apparatus is configured to store in memory the memory bank contents received from the first capture and transport apparatus.

* * * * *